United States Patent
Debert et al.

(10) Patent No.: US 10,532,735 B2
(45) Date of Patent: Jan. 14, 2020

(54) METHOD AND SYSTEM FOR STARTING A COMBUSTION ENGINE

(71) Applicant: RENAULT s.a.s., Boulogne-Billancourt (FR)

(72) Inventors: Maxime Debert, Versailles (FR); Gregory Launay, Paris (FR); Abdelmalek Maloum, Chevilly-Larue (FR); Ahmed Ketfi-Cherif, Elancourt (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 16/146,597

(22) Filed: Sep. 28, 2018

(65) Prior Publication Data
US 2019/0031185 A1     Jan. 31, 2019

Related U.S. Application Data

(63) Continuation of application No. 15/039,661, filed as application No. PCT/EP2014/075899 on Nov. 28, 2014, now abandoned.

(30) Foreign Application Priority Data

Nov. 28, 2013    (FR) ...................................... 13 61778

(51) Int. Cl.
*B60W 20/40*     (2016.01)
*B60W 30/188*     (2012.01)
(Continued)

(52) U.S. Cl.
CPC ............... *B60W 20/40* (2013.01); *B60K 6/52* (2013.01); *B60W 10/02* (2013.01); *B60W 10/06* (2013.01);
(Continued)

(58) Field of Classification Search
CPC ...... B60W 10/02; B60W 10/06; B60W 10/08; B60W 20/16; B60W 20/17; B60W 20/19;
(Continued)

(56) References Cited

U.S. PATENT DOCUMENTS

| 6,258,006 B1 | 7/2001 | Hanyu et al. |
| 6,543,561 B1 | 4/2003 | Pels et al. |

(Continued)

FOREIGN PATENT DOCUMENTS

| DE | 198 14 402 A1 | 10/1999 |
| DE | 102 60 435 A1 | 7/2004 |
| DE | 10 2009 027 001 A1 | 12/2010 |
| EP | 2 127 984 A1 | 12/2009 |
| EP | 2 292 489 A1 | 3/2011 |

OTHER PUBLICATIONS

International Search Report dated Mar. 9, 2015 for PCT/EP2014/075899 filed on Nov. 28, 2014.
French Search Report dated Aug. 8, 2014 for FR 1361778 filed on Nov. 28, 2013.

*Primary Examiner* — Dale W Hilgendorf
(74) *Attorney, Agent, or Firm* — Oblon, McClelland, Maier & Neustadt, L.L.P.

(57) ABSTRACT

A method for starting a combustion engine fitted to a hybrid or dual-mode motor vehicle includes starting an additional motor upon a setpoint torque demanded by a driver of the vehicle, with a view to accelerating the vehicle beyond a threshold speed at which the combustion engine is driven beyond a stalling speed threshold when the combustion engine is mechanically coupled to wheels of the vehicle.

12 Claims, 4 Drawing Sheets

(51) Int. Cl.
  *B60W 30/18* (2012.01)
  *B60K 6/52* (2007.10)
  *B60W 10/02* (2006.01)
  *B60W 10/06* (2006.01)
  *B60W 10/08* (2006.01)

(52) U.S. Cl.
  CPC .......... *B60W 10/08* (2013.01); *B60W 30/188* (2013.01); *B60W 30/18018* (2013.01); *B60W 30/18027* (2013.01); *B60W 30/1884* (2013.01); *B60W 30/1888* (2013.01); *B60W 2520/10* (2013.01); *B60Y 2200/92* (2013.01); *B60Y 2300/182* (2013.01); *B60Y 2300/42* (2013.01); *Y02T 10/6221* (2013.01); *Y02T 10/6265* (2013.01); *Y02T 10/6286* (2013.01); *Y10S 903/946* (2013.01)

(58) Field of Classification Search
  CPC ........... B60W 20/40; B60W 30/18018; B60W 30/30; B60W 30/18027; B60W 30/188; B60W 30/1882; B60W 30/1884; B60W 30/1888
  See application file for complete search history.

(56) References Cited

U.S. PATENT DOCUMENTS

| | | | |
|---|---|---|---|
| 7,996,139 | B2 | 8/2011 | Okuda et al. |
| 8,157,035 | B2 | 4/2012 | Whitney et al. |
| 8,403,807 | B2 | 3/2013 | Tabata et al. |
| 8,919,468 | B2 | 12/2014 | Ono et al. |
| 2007/0275818 | A1 | 11/2007 | Kouno |
| 2008/0099259 | A1 | 5/2008 | Tomo |
| 2009/0017984 | A1 | 1/2009 | Shibata et al. |
| 2009/0125172 | A1 | 5/2009 | Matsubara |
| 2010/0324762 | A1 | 12/2010 | Imaseki et al. |
| 2011/0082609 | A1 | 4/2011 | Favaretto |
| 2012/0130579 | A1 | 5/2012 | Steuernagel et al. |
| 2013/0304296 | A1 | 11/2013 | Ueda et al. |
| 2014/0136039 | A1 | 5/2014 | Tanishima et al. |
| 2017/0021826 | A1* | 1/2017 | Debert et al. ..... B60W 30/1888 |

* cited by examiner

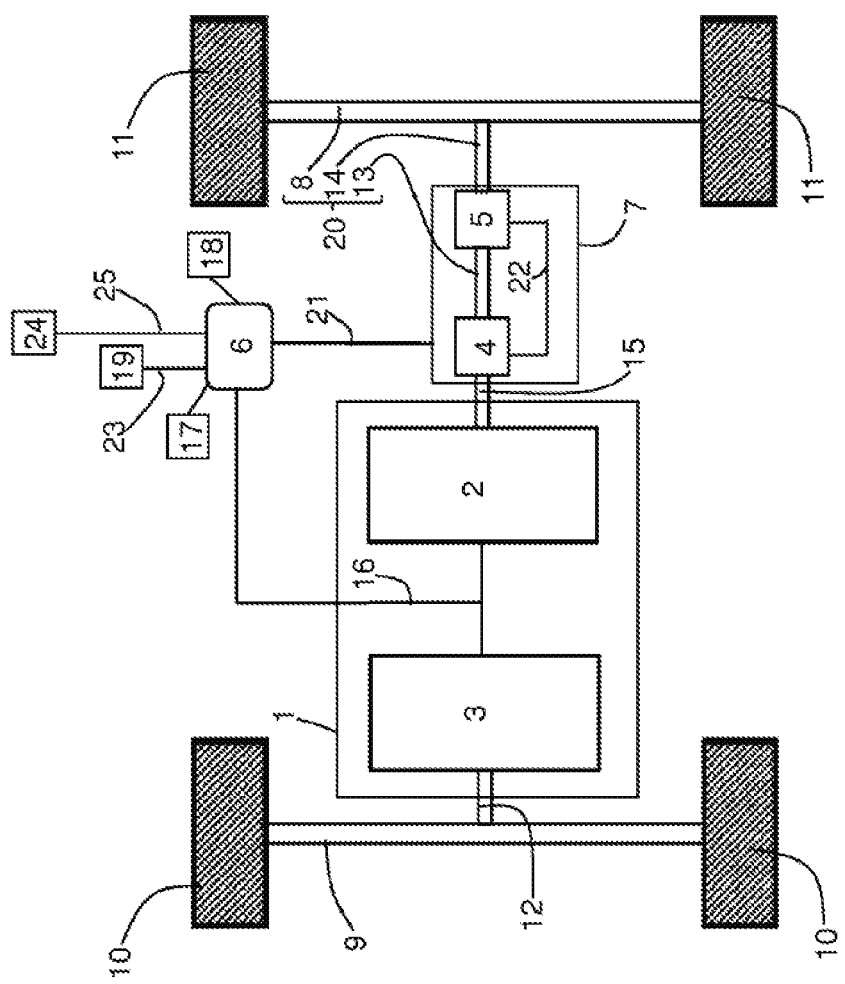

METHOD AND SYSTEM FOR STARTING A COMBUSTION ENGINE

CROSS REFERENCE TO RELATED APPLICATIONS

This application is a continuation of U.S. application Ser. No. 15/039,661, filed Sep. 12, 2016, which is a 371 National Stage of PCT/EP2014/075899, filed Nov. 28, 2014, and claims the benefit of priority under 35 U.S.C. § 119 of French Patent Application No. 1361778, filed Nov. 28, 2013. The entire contents of each of the above-identified applications is incorporated herein by reference.

BACKGROUND

The present invention relates to the field of combustion engines of vehicles provided with the function of automatically stopping and starting said engines.

The invention relates more particularly to a method for starting a combustion engine fitted to a motor vehicle of the hybrid or dual-mode type and a system for implementing such a method.

The invention further relates to a motor vehicle of the hybrid or dual-mode type comprising such a system for starting a combustion engine.

In the prior art, it is known to provide vehicles with the function of stopping and starting, also called "stop & start" or even "stop & go", consisting of automatically shutting down the combustion engine when the vehicle is stationary, whilst respecting certain conditions (neutral position, in particular with the parking brake engaged).

For example, in city driving when stopping at a red light the combustion engine is automatically stopped and then when the light turns to green it is started up following an action or series of actions by the driver, indicating a desire to restart the vehicle.

Such a stopping and starting function aims to reduce the overall consumption of the vehicle and to limit the polluting gas emissions generated by this vehicle, in addition to noise pollution.

To achieve this, the vehicles are able to function according to the "stop & go" or "stop & start" mode, by the use of a reversible electrical machine, such as an alternator-starter which is coupled to the combustion engine and powered by an inverter in start-up mode.

However, one of the major drawbacks associated with the use of an alternator-starter is that it remains an extremely costly solution in terms of manufacture and integration in a power train.

BRIEF SUMMARY

The present invention aims to remedy these problems resulting from the drawbacks of the prior art, within the context of a vehicle comprising two types of motor: a combustion engine motor and an additional motor of the electrical type or energy accumulation type.

Advantageously, the invention is implemented within a hybrid power train which does not contain an alternator-starter and comprises a combustion engine and one or two electric motors.

The invention relates to a method for starting a combustion engine fitted to a hybrid or dual-mode motor vehicle, providing a starting of an additional motor upon a setpoint torque demanded by a driver of the vehicle, with a view to accelerating the vehicle beyond a threshold speed at which the combustion engine is driven beyond its stalling speed threshold when said combustion engine is mechanically coupled to the wheels of the vehicle.

In further embodiments:
- the method comprises a processing step in which the speed of the vehicle is compared to the threshold speed;
- the starting of the combustion engine is carried out simultaneously with the stopping of the additional motor when the speed of the vehicle is substantially greater than or equal to the threshold speed;
- the coupling of the combustion engine to the wheels of the vehicle is carried out by the closure of a clutch of the vehicle;
- the method comprises a torque switching step, providing that the starting of the combustion engine and the stopping of the additional motor are carried out such that the torque provided to the wheels by the additional motor reduces as the torque provided to the wheels by the combustion engine increases;
- the method comprises a step of configuring the combustion engine, permitting the starting thereof;
- the step of configuring consists in the activation of a device for supplying fuel to the combustion engine and/or a device for the spark ignition of the vehicle and/or a device for preheating a mixing chamber of the combustion engine, and
- during the coupling, the method provides a determination of a suitable gear ratio which permits the continuity of the setpoint torque demanded by the driver of the vehicle to be ensured.

The invention further relates to a system for starting a combustion engine fitted to a hybrid or dual-mode motor vehicle, comprising hardware and software elements implementing a method for starting a combustion engine as claimed in any one of the preceding claims.

Advantageously, the hardware elements comprise a control unit, a speed sensor, an additional motor and a coupling device, the coupling device comprising, in particular, a robot-controlled gear box and a clutch and being capable of connecting the combustion engine to the wheels of the vehicle by means of a transmission chain.

The invention further relates to a hybrid or dual-mode motor vehicle comprising a combustion engine, the vehicle comprising such a starting system of the combustion engine, in particular the combustion engine and the additional motor being connected to different axles.

BRIEF DESCRIPTION OF THE DRAWINGS

Further advantages and features of the invention will become more apparent from reading the following description of a preferred embodiment, with reference to the figures below, provided by way of indicative and non-limiting example:

FIG. 1 shows schematically a vehicle comprising a system for controlling the starting of a combustion engine according to this embodiment of the invention;

DETAILED DESCRIPTION

Figure 2A:
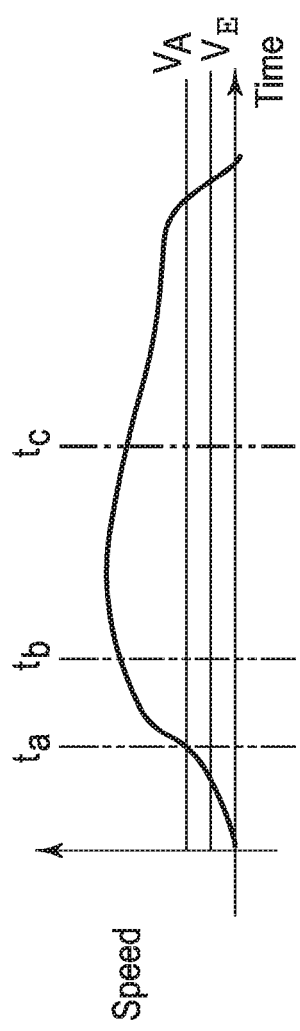
FIG. 2A shows the speed of the vehicle relative to the time, within the context of implementing the method for starting the combustion engine according to this embodiment of the invention.

In a non-limiting manner, this embodiment of the invention is implemented inside a vehicle comprising a hybrid 1 or dual-mode power train.

Such a vehicle comprises a chassis, a front axle comprising a shaft 8 connecting the front wheels 11, a rear axle comprising a shaft 9 connecting the rear wheels 10.

The hybrid 1 or dual-mode power train comprises two different types of motors, one motor thereof corresponding to a combustion engine 2, and an electric motor which thus corresponds to the additional motor 3 defined above.

The electric motor 3 is connected to a high voltage battery by means of a converter and an electronic control unit for the power supply thereof.

According to the embodiment shown, the combustion engine 2 drives the front shaft 8 and thus the front wheels 11, whilst the electric motor 3 drives the rear shaft 9 and thus the rear wheels 10. These two motors are mechanically independent of one another.

The electric motor 3 is thus arranged in the region of the rear axle of the vehicle or even integrated in said axle.

According to a variant embodiment, two electric motors are used, each being designed to drive one of the wheels 10 of the rear axle.

According to an additional variant embodiment, the additional motor 3 corresponds to an additional motor fitted on the vehicle, as a complement to the hybrid 1 or dual-mode power train.

Regarding the combustion engine 2, this engine may be arranged in the region of the front axle of the vehicle.

Thus, in this embodiment, the four wheels of the vehicle are motorized, without the complication of the mechanical transmission between the front and rear trains which could be encountered in certain vehicles.

According to the proposed embodiment, the electric motor 3 located in the region of the rear axle between the wheels 10 of the vehicle is mechanically connected to the rear axle shaft 9 by a transmission element 12. This transmission element 12 is capable of providing a torque which is transmitted to the wheels 10 by means of the rear axle shaft 9 in order to move the vehicle forward.

The electric motor 3 may comprise a clutch which is arranged so as to control the torque provided by the transmission element 12. This clutch may then also provide slippage so that the second drive wheels 10 are able to rotate at different angular speeds.

The combustion engine 2 is mechanically connected to a coupling device 7 by a transmission shaft 15, said device comprising a gear box 5 connected to a clutch 4 by one or more connecting elements 22. A torque converter may also be used.

This combustion engine 2 is capable of providing a torque which may be transmitted to the wheels 11 in order to permit the displacement of the vehicle, via the transmission shaft 15 and a transmission chain 20. This transmission chain 20 comprises the shaft 8 of the front axle, the front wheels 11 being connected thereto, and the input transmission shaft 13 and output transmission shaft 14 of the gear box 5.

Advantageously, according to a preferred embodiment of the invention, the gear box 5 is a robot-controlled gear box, capable of modifying the gear reduction ratio between the input transmission shaft 13 and the output transmission shaft 14 by hydraulic or electromechanical actuators. Such a gear box is easier to control in the hybrid operating mode of the vehicle, as well as at the start-up according to the invention, than a manual gear box.

The vehicle also comprises a system for starting the combustion engine 2 comprising:
 a control unit 6 for controlling the operating mode of the vehicle, connected to the motors 2 and 3 by a control connection 16 and connected to the coupling device 7 by means of the connection 21. The control unit 6 also comprises hardware resources which are capable of implementing a computer program,
 at least one sensor 24 capable of providing information about the setpoint torque provided by the driver or data representative of this setpoint and transmitted by a connection 25 to the control unit 6. This information may comprise, in particular, the activation of the accelerator pedal and/or brake of the vehicle, in addition to the extent to which these pedals are depressed;
 at least one speed sensor 19 of the vehicle connected to the control unit 6 by a connecting element 23.

The control unit 6 is, in particular, capable of determining dynamically the torques to be applied to each of the two front 8 and rear 9 axle shafts and optimizing the operation of the power train 1, also according to the motor functions 17 demanded by the driver and the driving conditions 18, data which are also transmitted to the control unit 6.

As has been seen above, the vehicle comprises a power train 1 which consists of two different motors and which is able to function according to two modes: a purely electric mode where only the motor 3 permits the displacement of the vehicle and a hybrid mode where the control unit 6 determines, as a function of the driving conditions, of the speed and of the torques required, which type of motor is most suitable from the combustion engine motor and/or the electric motor.

In hybrid operation, when the vehicle moves, the control unit 6 continuously receives signals from the speed sensor 19, from the sensor 24, permitting the setpoint torque provided by the driver to be determined, in addition to the driving conditions 18 and the motor functions 17 desired by the driver. This setpoint torque corresponds, for example, to parameters resulting from the behavior of the driver.

This control unit 6 is also capable of monitoring the combustion engine 2 and the additional motor 3 in addition to the coupling device 7 by receiving/emitting signals from/toward each of said devices.

Figure 2B:
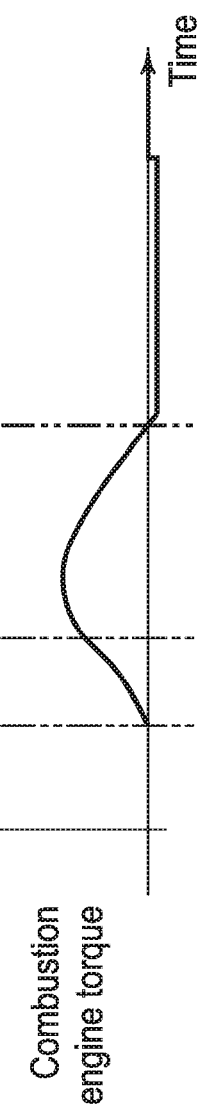
FIG. 2B shows the torque provided by the combustion engine relative to the time, within the context of implementing the method for starting the combustion engine according to this embodiment of the invention.
Figure 2C:
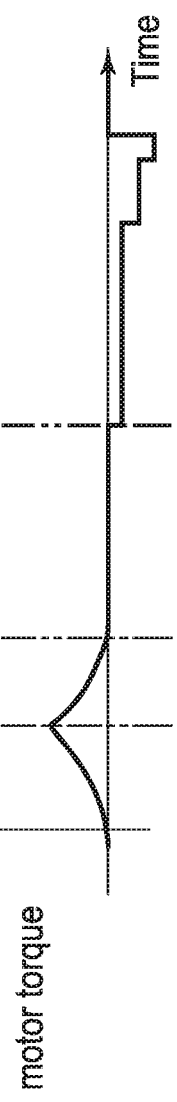
FIG. 2C shows the torque provided by an additional motor relative to the time, within the context of implementing the method for starting the combustion engine according to this embodiment of the invention.
Figure 4:
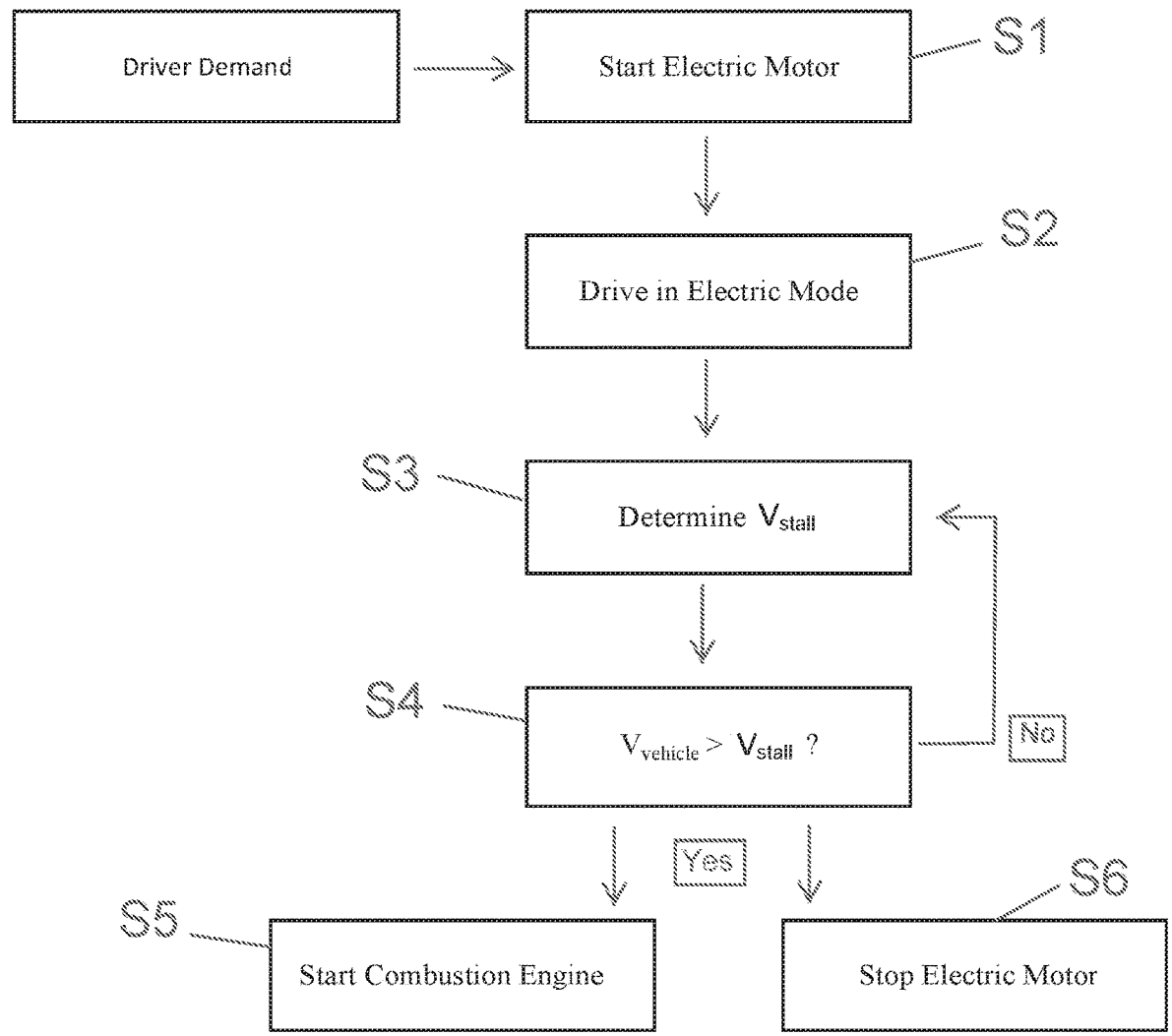
FIG. 4 illustrates a method for starting the combustion engine according to an embodiment of the invention.

According to the invention, in hybrid mode, when the combustion engine 2 is stopped by the stop & start device, when the driver wishes to displace the vehicle once again (Driver Demand in FIG. 4), it is not the combustion engine 2 which is started but the electric motor 3 (S1 in FIG. 4), with reference to FIGS. 2A, 2C, and 4. The vehicle is thus in an electric mode where the electric motor 3 alone ensures the displacement of the vehicle.

This mode continues (S2 in FIG. 4) as long as the speed of the vehicle is less than or equal to the speed $V_A$. This speed $V_A$ corresponds to a threshold speed at which the combustion engine 2 may be driven beyond its stalling speed threshold, when the mechanical coupling is carried out (S3 in FIG. 4). The value of this threshold depends on the staging of the gear box and is between 15 km/h and 40 km/h.

During a processing step (S4 in FIG. 4), the control unit 6 thus compares the speed V of the vehicle to the threshold $V_A$, in order to determine if the combustion engine 2 is able to be started.

When the speed V of the vehicle is substantially greater than or equal to the speed $V_A$, at the time $t_a$, the control unit 6 then emits a signal which aims simultaneously to start the combustion engine 2 (S5 in FIG. 4) and to trigger the stopping of the electric motor 3 (S6 in FIG. 4), with reference to FIGS. 2A, 2B, 2C, and 4.

The control unit 6 also emits a signal to the coupling device 7 such that the combustion engine 2 is coupled to the wheels 11 of the front axle of the vehicle, by closing the clutch, during a coupling step.

More specifically, the transmission element 15 is mechanically coupled to the transmission chain 20 which connects this transmission element 15 to the wheels 11. During this coupling step, the torque provided by the combustion engine 2 is controlled to be at zero, so that the driver does not feel a sudden jerk.

The control unit 6 also implements a configuration of the combustion engine 2 so that said combustion engine is ready to start up. To achieve this, the control unit 6 activates a device for supplying fuel to the combustion engine 2 and possibly a device for spark ignition of the vehicle—a controlled or electronic spark ignition system—or a device for preheating the mixing chamber of the combustion engine 2.

During this coupling step, the control unit 6 also determines the appropriate gear ratio which will be applied by the coupling device 7 via the gear box 5 in order to ensure the continuity of the torque demanded by the driver.

Moreover, during a torque switching step, the control unit 6 provides that the starting of the combustion engine 2, at the time $t_a$, and the stopping of the additional motor 3 are carried out such that the torque provided to the wheels 10 by the additional motor 3 reduces until it becomes zero, at the time $t_b$, as the torque provided to the wheels 11 by the combustion engine 2 increases.

Figure 3:
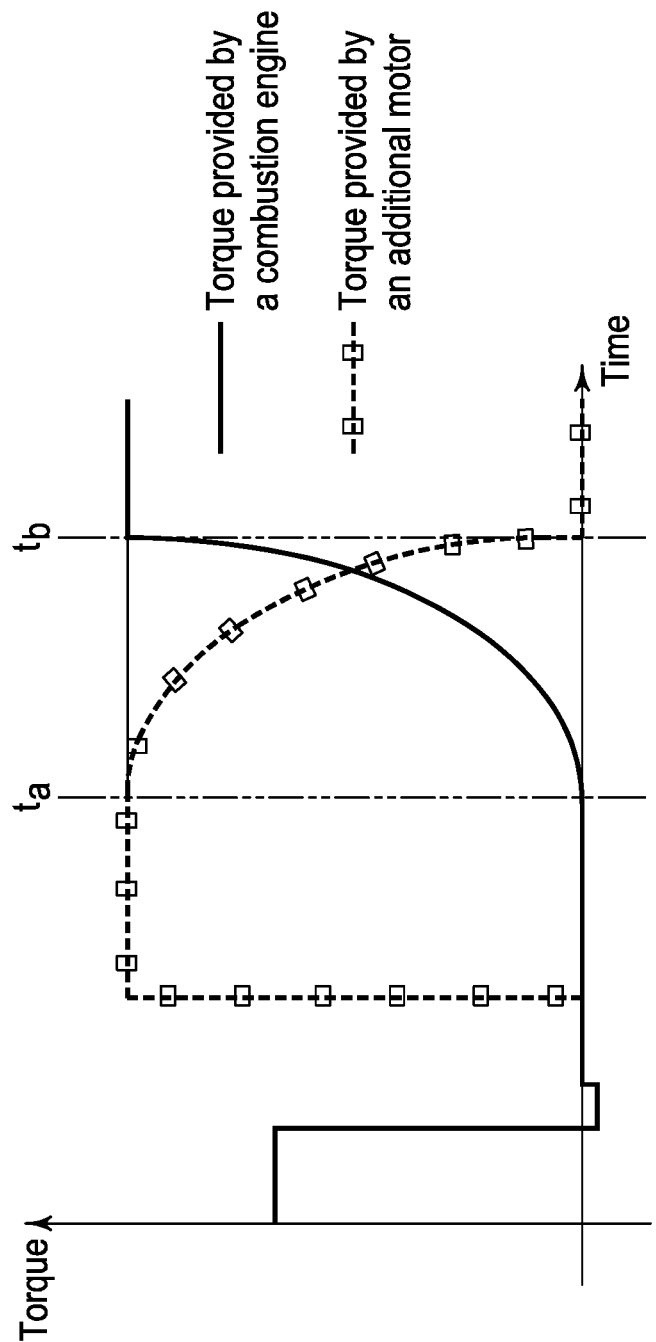
FIG. 3 illustrates a switching between the torques provided by the combustion engine and the additional motor, within the context of implementing the method for starting the combustion engine according to this embodiment of the invention.

This torque switching step is illustrated in FIG. 3 between the times $t_a$ and $t_b$ as defined above. This switching step permits a continuity of torque in phase to be ensured, in particular with the setpoint torque demanded by the driver.

After carrying out the switching step, from the time $t_b$ the vehicle travels in hybrid mode with, according to the example proposed, only the combustion engine 2 activated.

The hybrid mode may also comprise a simultaneous operation of the electric motor 3 and the combustion engine 2 during, for example, very rapid acceleration.

According to one embodiment of the invention, when the driver wishes to decelerate the vehicle, for example by lifting the foot from the accelerator, the vehicle decelerates and the torque of the combustion engine 2 reduces as FIG. 2B shows.

Henceforth, from the time $t_c$ when the torque generated by the combustion engine is zero, the electric motor 3 is activated, producing a braking action which may be recuperative in order to transform a part of the mechanical energy as a result of the braking action into electrical energy. The additional motor 3 thus functions as a generator. This effect increases gradually as the speed reduces.

With reference to FIGS. 2A and 3, when the speed V of the vehicle is substantially less than or equal to a threshold speed $V_E$, less than $V_A$, the control unit 6 then emits a signal with the purpose of stopping the combustion engine 2 and at the same time increasing the action of the electric motor 3 in its operation as a generator.

The speed $V_E$ corresponds to a speed threshold which is able to be configured in terms of the speed V of the vehicle being compared during a processing step carried out by the control unit 6 in order to determine if the combustion engine 2 has to be stopped. The value of this threshold speed $V_E$ depends on the staging of the gear box and may range from approximately 6 km/h to 12 km/h.

The control unit 6 also emits a signal to the coupling device 7 such that the transmission element 15 of the combustion engine 2 is mechanically decoupled from the transmission chain 20 which connects this transmission element 15 to the first wheels 11 of the front axle of the vehicle.

In a variant embodiment of the invention, it may be provided that the control unit 6 takes account of the battery charge for controlling the starting mode of the vehicle, as conceived in the present invention. It is conceivable, in particular, that the control unit 6 inhibits this operating mode when the level of battery charge is low and/or ensures that a device permits the battery to be recharged in the driving phases of the vehicle so that the vehicle may be started by the additional motor.

It should be noted that in one variant the combustion engine 2 and the additional motor 3 may be connected to the same axle.

This additional motor 3 may also relate to any motor operating according to the following technologies:
fuel cell;
latent energy from the compression-expansion of gas, and/or
flywheel.

The invention claimed is:

1. A method for starting a combustion engine fitted to a hybrid or dual-mode motor vehicle, comprising:
   starting an electric motor upon a setpoint torque demanded by a driver of the vehicle, and displacing the vehicle from rest by only the electric motor in an electric mode, the electric motor being mechanically coupled a first set of wheels of the vehicle to displace the vehicle by driving the first set of wheels;
   determining a threshold speed at which the combustion engine is driven, including determining that the threshold speed is beyond a stalling speed threshold when said combustion engine is mechanically coupled to a second set of wheels of the vehicle, a value of the threshold speed depending on a gear ratio of a gearbox that couples the combustion engine to the second set of wheels of the vehicle, the second set of wheels being different wheels of the vehicle than the first set of wheels;
   after the determining, comparing a speed of the vehicle to the threshold speed; and
   starting the combustion engine when a result of the comparing is that the speed of the vehicle is equal to or greater than the threshold speed to drive the first set of wheels of the vehicle by the combustion engine,
   wherein the electric motor and the combustion engine are connected to different axles.

2. The method as claimed in claim 1, wherein the starting of the combustion engine is carried out simultaneously with a stopping of the electric motor.

3. The method as claimed in claim 2, further comprising a torque switching step, providing that the starting of the combustion engine and the stopping of the electric motor are carried out such that a torque provided to the first set of wheels by the electric motor reduces as a torque provided to the second set of wheels by the combustion engine increases.

4. The method as claimed in claim 1, wherein the combustion engine is mechanically coupled to the second set of wheels of the vehicle by a closure of a clutch of the vehicle.

5. The method as claimed in claim 1, wherein the starting the engine includes configuring the combustion engine, permitting the starting thereof.

6. The method as claimed in claim 5, wherein the step of configuring includes activating a device for supplying fuel to the combustion engine and/or a device for a spark ignition of the vehicle and/or a device for preheating a mixing chamber of the combustion engine.

7. The method as claimed in claim 1, wherein the vehicle does not include a starter and alternator.

8. A system for starting a combustion engine fitted to a hybrid or dual-mode motor vehicle, comprising:
hardware and software elements configured to:
start an electric motor upon a setpoint torque demanded by a driver of the vehicle, and displace the vehicle from rest by only the electric motor in an electric mode, the electric motor being mechanically coupled a first set of wheels of the vehicle to displace the vehicle by driving the first set of wheels;
determine a threshold speed at which the combustion engine is driven, including determining that the threshold speed is beyond a stalling speed threshold when said combustion engine is mechanically coupled to a second set of wheels of the vehicle, a value of the threshold speed depending on a gear ratio of a gearbox that couples the combustion engine to the second set of wheels of the vehicle, the second set of wheels being different wheels of the vehicle than the first set of wheels;
compare, after the threshold speed is determined, a speed of the vehicle to the threshold speed; and
start the combustion engine when a result of the comparing is that the speed of the vehicle is equal to or greater than the threshold speed to drive the first set of wheels of the vehicle by the combustion engine, wherein the electric motor and the combustion engine are connected to different axles.

9. The system as claimed in claim 8, wherein the hardware elements comprise a control unit, a speed sensor, the additional motor, and a coupling device, the coupling device comprising, a robot-controlled gear box and a clutch and being configured to connect the combustion engine to the second set of wheels of the vehicle by a transmission chain.

10. The system as claimed in claim 8, wherein the vehicle does not include a starter and alternator.

11. A hybrid or dual-mode motor vehicle, comprising:
a combustion engine including a system for starting the combustion engine, the system including a control unit that is configured to:
start an electric motor upon a setpoint torque demanded by a driver of the vehicle, and displace the vehicle from rest by only the electric motor in an electric mode, the electric motor being mechanically coupled a first set of wheels of the vehicle to displace the vehicle by driving the first set of wheels;
determine a threshold speed at which the combustion engine is driven, including determining that the threshold speed is beyond a stalling speed threshold when said combustion engine is mechanically coupled to a second set of wheels of the vehicle, a value of the threshold speed depending on a gear ratio of a gearbox that couples the combustion engine to the second set of wheels of the vehicle, the second set of wheels being different wheels of the vehicle than the first set of wheels;
compare, after the threshold speed is determined, a speed of the vehicle to the threshold speed; and
start the combustion engine when a result of the comparing is that the speed of the vehicle is equal to or greater than the threshold speed to drive the first set of wheels of the vehicle by the combustion engine,
wherein the combustion engine and the electric motor are connected to different axles.

12. The vehicle as claimed in claim 11, wherein the vehicle does not include a starter and alternator.

* * * * *